(12) United States Patent
Chang et al.

(10) Patent No.: US 10,704,917 B2
(45) Date of Patent: Jul. 7, 2020

(54) IMAGE POSITIONING METHOD AND IMAGE POSITIONING DEVICE FOR USING THE SAME

(71) Applicant: AUTOMOTIVE RESEARCH & TESTING CENTER, Lugang, Changhua County (TW)

(72) Inventors: Che-Cheng Chang, Lugang (TW); Yi Yan, Lugang (TW); Wun-Sheng Yao, Lugang (TW)

(73) Assignee: AUTOMOTIVE RESEARCH & TESTING CENTER, Changhua County (TW)

( * ) Notice: Subject to any disclaimer, the term of this patent is extended or adjusted under 35 U.S.C. 154(b) by 28 days.

(21) Appl. No.: 15/855,641

(22) Filed: Dec. 27, 2017

(65) Prior Publication Data

US 2019/0195649 A1    Jun. 27, 2019

(51) Int. Cl.
*G01C 21/36* (2006.01)
*G01B 11/00* (2006.01)
*G06K 9/00* (2006.01)
*G06T 7/33* (2017.01)

(52) U.S. Cl.
CPC ........ *G01C 21/3623* (2013.01); *G01B 11/002* (2013.01); *G01C 21/3667* (2013.01); *G06K 9/00818* (2013.01); *G06K 9/00825* (2013.01); *G06T 7/337* (2017.01)

(58) Field of Classification Search
CPC ........... G01C 21/3623; G01C 21/3667; G06T 7/337; G06K 9/00825; G06K 9/00818; G01B 11/002
See application file for complete search history.

(56) References Cited

U.S. PATENT DOCUMENTS 9,285,805 B1 * 3/2016 Pollock ................ G05D 1/0212
2018/0045519 A1 * 2/2018 Ghadiok ................ G01C 21/30

* cited by examiner

*Primary Examiner* — Nasim N Nirjhar
(74) *Attorney, Agent, or Firm* — Muncy, Geissler, Olds & Lowe, P.C.

(57) ABSTRACT

An image positioning method and an image positioning device for using the same is disclosed. The method finds the position of a vehicle that is driving on a road, and a plurality of signs is arranged on the road. Firstly, an electronic map having a plurality of paths, a plurality reference images, and characteristic positions of the plurality of paths and the plurality reference images is provided. Next, at least two positioning images of the signs closest to the vehicle are sequentially retrieved. The reference image identical to the positioning images are searched on the electronic map and used as characteristic images. When the order of all the characteristic images corresponds to the order of all the positioning images, the position of the vehicle is estimated according to the path corresponding to all the characteristic images and the characteristic positions of all the characteristic images.

13 Claims, 5 Drawing Sheets

IMAGE POSITIONING METHOD AND IMAGE POSITIONING DEVICE FOR USING THE SAME

BACKGROUND OF THE INVENTION

Field of the Invention

The present invention relates to positioning technology, particularly to an image positioning method and an image positioning device for using the same.

Description of the Related Art

Figure 1:
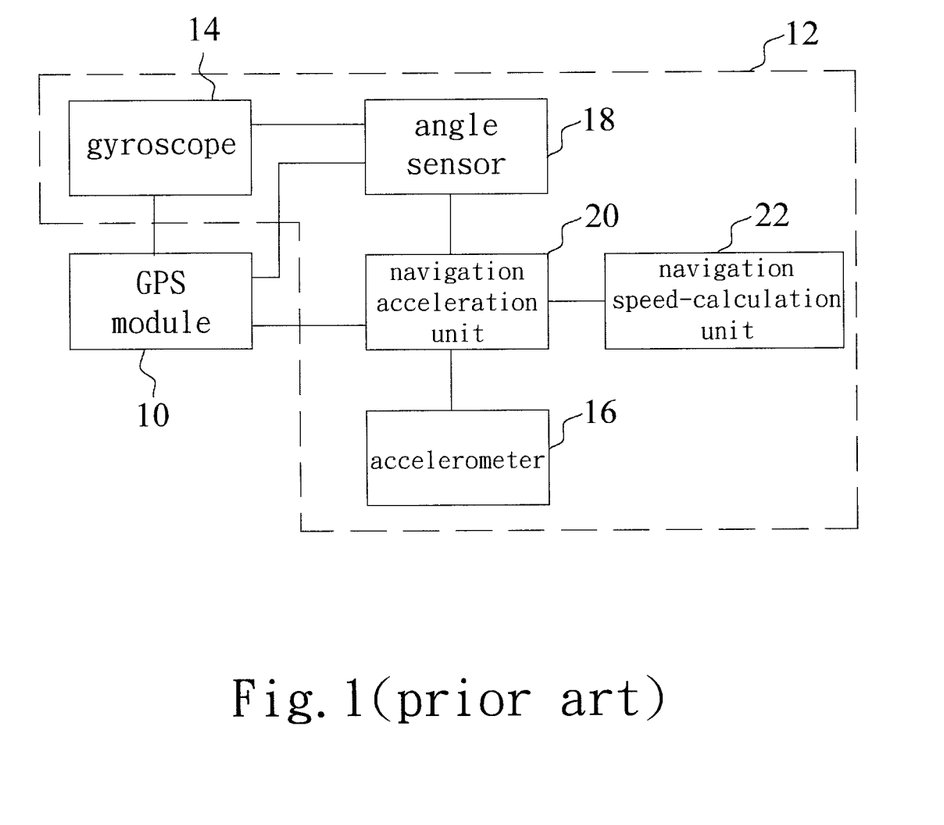
FIG. 1 is a block diagram showing a GPS navigation system in the conventional technology.

In general, a conventional vehicle positioning system is a GPS navigation system. With reference to FIG. 1, the GPS navigation system has a GPS module 10 and an IMU (Inertial Measurement Unit) module 12. The GPS module 10 receives positioning information from multiple satellites, and the positioning information comprises driving data including at least longitude, latitude, direction, and speed of the vehicle on which the GPS module 10 is mounted. The IMU module 12 has a gyroscope 14, an accelerometer 16, an angle sensor 18, a navigation acceleration unit 20, and a navigation speed-calculation unit 22, so the IMU module 12 outputs current vehicle inertial data including driving direction, speed and so on. The final GPS coordinates of the vehicle are decided by the GPS navigation system according to the positioning information of the GPS module 10 and the vehicle inertial data from the IMU module 12. For example, the GPS navigation system uses the driving direction and speed from the IMU module 12 and corrects the direction and speed from the GPS module 10.

The GPS module 10 cannot provide the available driving data when the vehicle is located at the environment without GPS signals or with weak GPS signals, such as a location under a bridge or in the building. Although the GPS navigation system may obtain a last available driving data before the vehicle is driving into the building and cooperates with the vehicle inertial data from the IMU module 12 to generate the GPS coordinates, inaccurate GPS coordinates may be calculated since the sensing errors of the IMU module are accumulated. Although some technology uses an image retriever to retrieve images and street views of an electronic map and compare them, thereby positioning a vehicle. However, the resolution of the image retriever has to be very high, such that the complicated street views can be recognized. In order to recognize the uniqueness of street views, the electronic map occupies many storing spaces and the image retriever has the higher cost.

To overcome the abovementioned problems, the present invention provides an image positioning method and an image positioning device for using the same, so as to solve the afore-mentioned problems of the prior art.

SUMMARY OF THE INVENTION

A primary objective of the present invention is to provide an image positioning method and an image positioning device for using the same, which compares images to position a vehicle without using a global positioning system, thereby reducing the storing space of an electronic map.

To achieve the abovementioned objectives, the present invention provides an image positioning method, which finds a position of a vehicle that is driving on a road, and a plurality of signs is sequentially arranged on the road in a direction that the vehicle moves. The image positioning method comprises: (a) providing an electronic map having a plurality of paths, a plurality reference images, and characteristic positions of the plurality of paths and the plurality reference images, and the characteristic positions of the plurality of reference images correspond to the characteristic positions of the plurality of paths; (b) retrieving an n-th positioning image of the sign closest to the vehicle, searching the reference images identical to the n-th positioning image on the electronic map, and using the reference images identical to the n-th positioning image as n-th characteristic images, wherein n is a natural number; (c) retrieving an (n+1)-th positioning image of the sign closest to the vehicle after the vehicle moves a displacement on the road, searching the reference images identical to the (n+1)-th positioning image on the electronic map according to the electronic map, the displacement, and the characteristic positions of the n-th characteristic images, and using the reference images identical to the (n+1)-th positioning image as (n+1)-th characteristic images; and (d) ordering all the characteristic images corresponding to each other according to their searched time to establish characteristic image sequences, and ordering all the positioning images according to their retrieved time to establish a positioning image sequence, and determining whether the number of the characteristic image sequences that correspond to the positioning image sequence is one: if no, estimating the position of the vehicle according to the displacement, the electronic map, the path corresponding to the positioning image sequence, and the characteristic positions of the n-th characteristic image and the (n+1)-th characteristic image; and if yes, adding 1 to n and repeatedly performing operation (c).

In an embodiment of the present invention, the sign is a signboard, a guideboard, a landmark, a traffic sign, or a traffic light.

In an embodiment of the present invention, the reference image is an image of a signboard, a guideboard, a landmark, a traffic sign, or a traffic light.

In an embodiment of the present invention, the position of the vehicle and the characteristic position are absolute coordinates.

In an embodiment of the present invention, the displacement comprises a straight displacement and an angle displacement The present invention also provides an image positioning device, which installed in a vehicle that is driving on a road, and a plurality of signs is sequentially arranged on the road in a direction that the vehicle moves, and the image positioning device comprises: an image retriever sequentially retrieving an n-th positioning image and an (n+1)-th positioning image of the signs closest to the vehicle, and n is a natural number, and the image retriever generates driving signals when the image retriever retrieves the n-th positioning image and the (n+1)-th positioning image; a storage storing an electronic map, and the electronic map has a plurality of paths, a plurality reference images, and characteristic positions of the plurality of paths and the plurality reference images, and the characteristic positions of the plurality of reference images correspond to the characteristic positions of the plurality of paths; a displacement detector electrically connected to the image retriever and receiving the driving signals, and the displacement detector detects a displacement that the vehicle moves within a period between two time points when the displacement detector receives the driving signals; and a processor electrically connected to the image retriever, the storage, and displacement detector, and the processor searches the reference images identical to the n-th positioning image on the electronic map, uses the reference images identical to the n-th positioning image as n-th characteristic images, searches the reference images identical to the (n+1)-th positioning image on the electronic map according to the electronic map, the displacement, and the characteristic positions of the n-th characteristic images, uses the reference images identical to the (n+1)-th positioning image as (n+1)-th characteristic images, orders all the characteristic images corresponding to each other according to their searched time to establish characteristic image sequences, and orders all the positioning images according to their retrieved time to establish a positioning image sequence, and when the number of the characteristic image sequences that correspond to the positioning image sequence is one, the processor estimates the position of the vehicle according to the displacement, the electronic map, the path corresponding to the positioning image sequence, and the characteristic positions of the n-th characteristic image and the (n+1)-th characteristic image.

In an embodiment of the present invention, the processor endlessly increases n until the number of the characteristic image sequences that correspond to the positioning image sequence is one.

In an embodiment of the present invention, the displacement detector further comprises: an accelerator measuring accelerations within the period; and a displacement calculator electrically connected to the accelerator, the image retriever, and the processor, receiving the accelerations and the driving signals, and calculating the displacement according to the accelerations, the period, and the driving signals.

In an embodiment of the present invention, the image retriever is a camera.

In an embodiment of the present invention, the sign is a signboard, a guideboard, a landmark, a traffic sign, or a traffic light.

In an embodiment of the present invention, the reference image is an image of a signboard, a guideboard, a landmark, a traffic sign, or a traffic light.

In an embodiment of the present invention, the position of the vehicle and the characteristic position are absolute coordinates.

In an embodiment of the present invention, the displacement comprises a straight displacement and an angle displacement.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Figure 2:
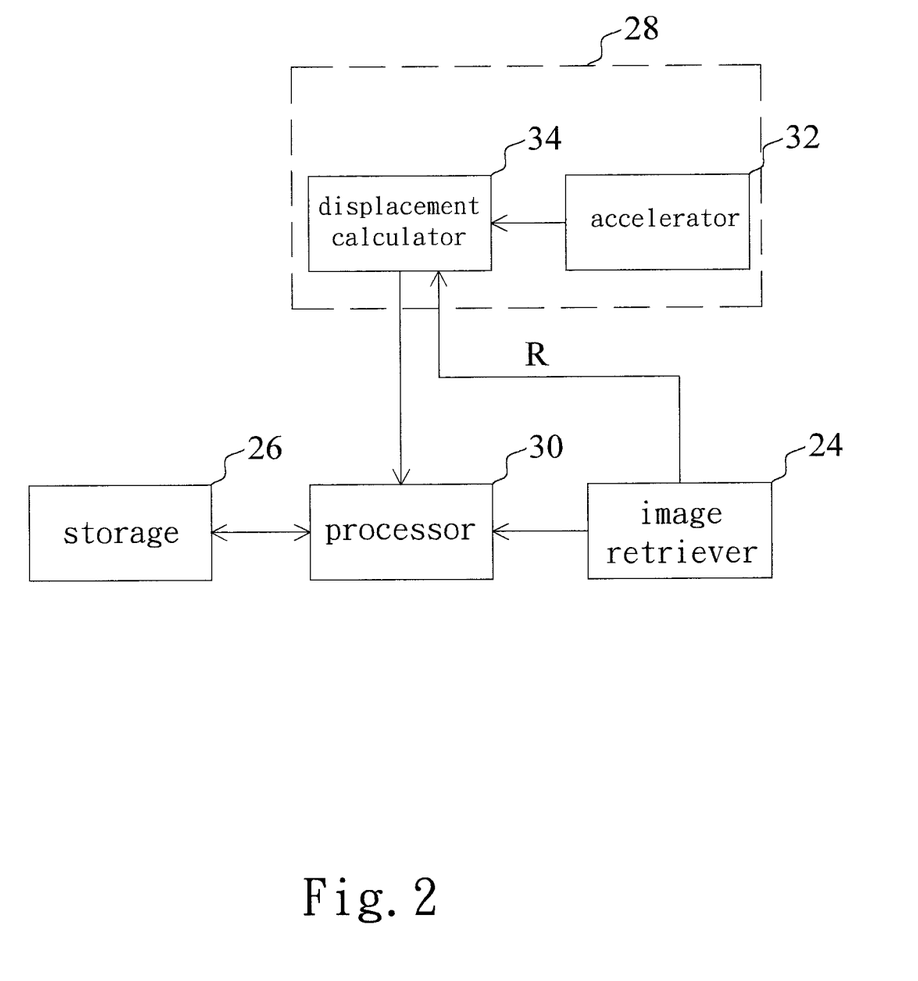
FIG. 2 is a block diagram showing an image positioning device according to an embodiment of the present invention.

Refer to FIG. 2. The image positioning device is introduced as follows. The image positioning device is installed in a vehicle that is driving on a road, and a plurality of signs is sequentially arranged on the road in a direction that the vehicle moves. For example, the sign is a signboard, a guideboard, a landmark, a traffic sign, or a traffic light. The image positioning device comprises an image retriever 24, a storage 26, a displacement detector 28, and a processor 30. For example, the image retriever 24 is a camera. The image retriever 24 sequentially retrieves an n-th positioning image and an (n+1)-th positioning image of the signs closest to the vehicle, and n is a natural number. The image retriever 24 generates driving signals R when the image retriever 24 retrieves the n-th positioning image and the (n+1)-th positioning image. The storage 26 stores an electronic map, and the electronic map has a plurality of paths, a plurality reference images, and characteristic positions of the plurality of paths and the plurality reference images, and the characteristic positions of the plurality of reference images correspond to the characteristic positions of the plurality of paths. For example, the reference image is the image of a signboard, a guideboard, a landmark, a traffic sign, or a traffic light. The position of the vehicle and the characteristic position are absolute coordinates including latitude and longitude. The displacement detector 28 is electrically connected to the image retriever 24 and receives the driving signals R. The displacement detector 28 detects a displacement that the vehicle moves within a period between two time points when the displacement detector 28 receives the driving signals R. The displacement comprises a straight displacement and an angle displacement. The processor 30 is electrically connected to the image retriever 24, the storage 26, and the displacement detector 28. The processor 30 searches the reference images identical to the n-th positioning image on the electronic map, uses the reference images identical to the n-th positioning image as n-th characteristic images, searches the reference images identical to the (n+1)-th positioning image on the electronic map according to the electronic map, the displacement, and the characteristic positions of the n-th characteristic images, and uses the reference images identical to the (n+1)-th positioning image as (n+1)-th characteristic images. When the resolution of the image retriever 24 is low, the image retriever 24 at least retrieves the color, size, and shape of the positioning image to compare the positioning image with the reference image. Thus, the reference image does not need to have high resolution to reduce the storing space of the electronic map. The processor 30 orders all the characteristic images corresponding to each other according to their searched time to establish characteristic image sequences, and orders all the positioning images according to their retrieved time to establish a positioning image sequence. When the number of the characteristic image sequences that correspond to the positioning image sequence is one, the processor 30 estimates the position of the vehicle according to the displacement, the electronic map, the path corresponding to the positioning image sequence, and the characteristic positions of the n-th characteristic image and the (n+1)-th characteristic image. When the number of the characteristic image sequences that correspond to the positioning image sequence is not one, the processor 30 endlessly increases n until the number of the characteristic image sequences that correspond to the positioning image sequence is one. The present invention positions the vehicle without using a global positioning system. When the image retriever 24 has high resolution, the image positioning device 24 can replace the existing global positioning system. When the image retriever 24 has low resolution, the image positioning device 24 can be applied to the navigation for fixed regions. As a result, when the image retriever 24 has high resolution or low resolution, the image positioning device is applied to the high precision navigation for an autonomous driving assistant system.

The displacement detector 28 further comprises an accelerator 32 and a displacement calculator 34. The displacement calculator measures accelerations within the period. The displacement calculator 34 is electrically connected to the accelerator 32, the image retriever 24, and the processor 30, receives the accelerations and the driving signals R, and calculates the displacement according to the accelerations, the period, and the driving signals R.

Figure 3:
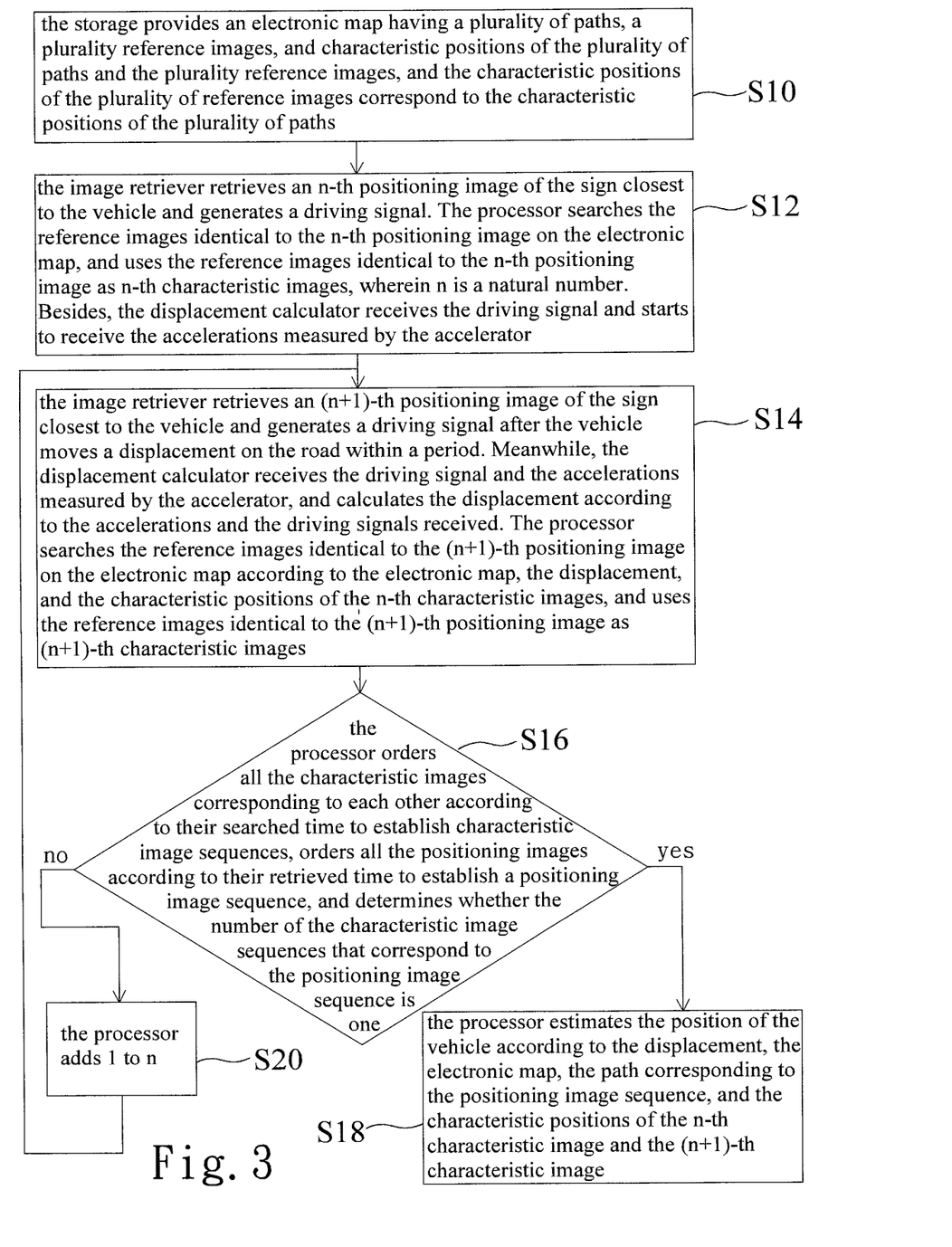
FIG. 3 is a flowchart of an image positioning method according to an embodiment of the present invention.

The image positioning method of the present invention is introduced as follows. Refer to FIG. 2 and FIG. 3. Firstly, in Step S10, the storage 26 provides an electronic map having a plurality of paths, a plurality reference images, and characteristic positions of the plurality of paths and the plurality reference images, and the characteristic positions of the plurality of reference images correspond to the characteristic positions of the plurality of paths. Next, in Step S12, the image retriever 24 retrieves an n-th positioning image of the sign closest to the vehicle and generates a driving signal. The processor 30 searches the reference images identical to the n-th positioning image on the electronic map, and uses the reference images identical to the n-th positioning image as n-th characteristic images, wherein n is a natural number. Besides, the displacement calculator 34 receives the driving signal R and starts to receive the accelerations measured by the accelerator 32. Next, in Step S14, the image retriever 24 retrieves an (n+1)-th positioning image of the sign closest to the vehicle and generates a driving signal R after the vehicle moves a displacement on the road within a period. Meanwhile, the displacement calculator 34 receives the driving signal R and the accelerations measured by the accelerator 32, and calculates the displacement according to the accelerations and the driving signals R received. The processor 30 searches the reference images identical to the (n+1)-th positioning image on the electronic map according to the electronic map, the displacement, and the characteristic positions of the n-th characteristic images, and uses the reference images identical to the (n+1)-th positioning image as (n+1)-th characteristic images. Finally, in Step S16, the processor 30 orders all the characteristic images corresponding to each other according to their searched time to establish characteristic image sequences, orders all the positioning images according to their retrieved time to establish a positioning image sequence, and determines whether the number of the characteristic image sequences that correspond to the positioning image sequence is one. If the answer is yes, the process proceeds to Step S18. If the answer is no, the process proceeds to Step S20. In Step S18, the processor 30 estimates the position of the vehicle according to the displacement, the electronic map, the path corresponding to the positioning image sequence, and the characteristic positions of the n-th characteristic image and the (n+1)-th characteristic image. In Step S20, the processor 30 adds 1 to n and repeatedly performs Step S14.

Figure 4A:
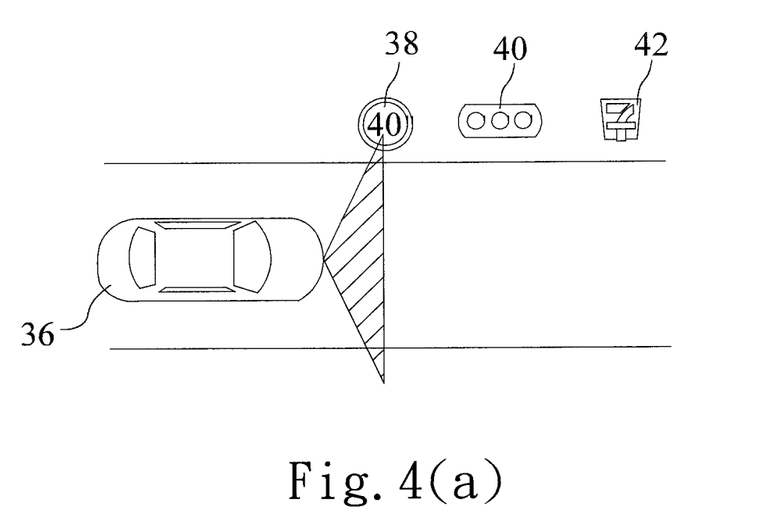
FIGS. 4(a)-4(c) are diagrams schematically showing a process for retrieving positioning images of signs according to an embodiment of the present invention.
Figure 4B:
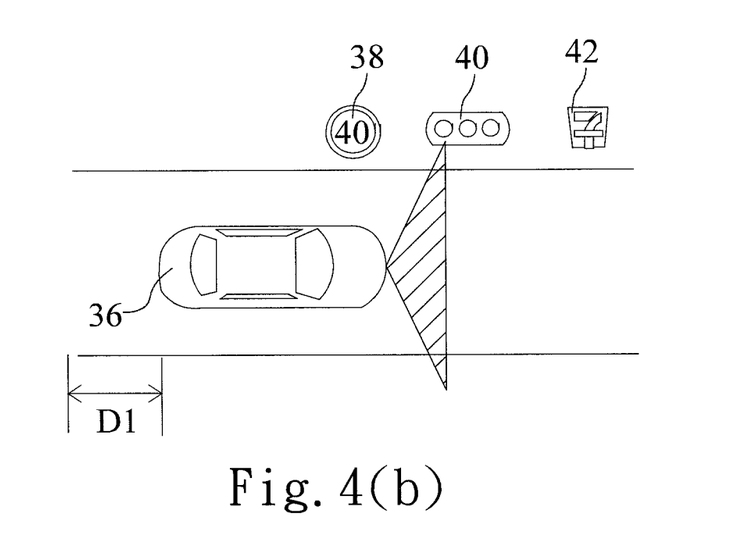
Figure 4C:
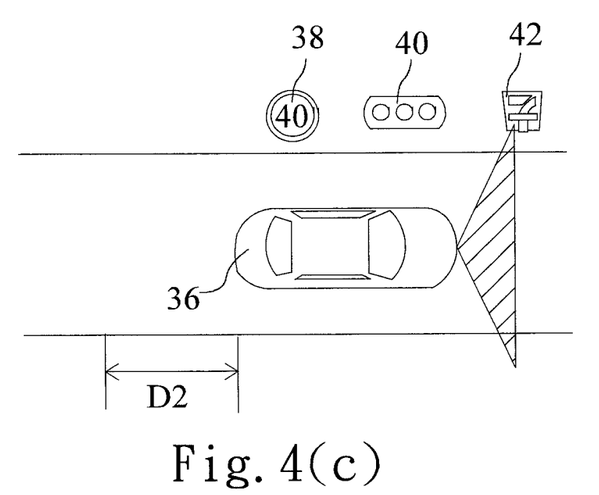

Refer to FIG. 2 and FIGS. 4 (a)-4(c). Specifically, there is a vehicle 36 that is driving on a road. A plurality of signs is arranged on the road. The plurality of signs is sequentially arranged on the road in a direction that the vehicle 36 moves. The signs include a traffic sign 38, a traffic light 40, and a signboard 42. Firstly, as shown in FIG. 4 (a), the image retriever 24 retrieves the first positioning image of the traffic sign 38 closest to the vehicle 36 and generates a driving signal R, and the processor 30 searches the reference image identical to the first positioning image on the electronic map and uses the reference images identical to the first positioning image as the first characteristic images. Wherein, the number of the first characteristic images is three, and the characteristic positions of the first characteristic images are different. In addition the displacement calculator 34 receives the driving signal R and starts to receive the accelerations measured by the accelerator 32. Next, as shown in FIG. 4 (b), the image retriever 24 retrieves the second positioning image of the traffic light 40 closest to the vehicle 36 and generates a driving signal R after the vehicle 36 moves a displacement D1 within a period T1. Meanwhile, the displacement calculator 34 receives the accelerations measured by the accelerator 32 and the driving signal R, and calculates the displacement D1 according to the accelerations and the driving signal R received. The processor 30 searches the reference images identical to the second positioning image on the electronic map according to the electronic map, the displacement D1, and the first characteristic images, and uses the reference images identical to the second positioning image as the second characteristic images. Wherein, the number of the second characteristic images is two, and the characteristic positions of the second characteristic images are different. Finally, as shown in FIG. 4 (c), the image retriever 24 retrieves the third positioning image of the signboard 42 closest to the vehicle 36 and generates a driving signal R after the vehicle 36 moves a displacement D2 within a period T2. Meanwhile, the displacement calculator 34 receives the accelerations measured by the accelerator 32 and the driving signal R, and calculates the displacement D2 according to the accelerations and the driving signal R received. The processor 30 searches the reference image identical to the third positioning image on the electronic map according to the electronic map, the displacement D2, and the second characteristic images, and uses the reference image identical to the third positioning image as the third characteristic image. Thus, the positioning image sequence includes the first positioning image, the second positioning image, and the third positioning image. The number of the characteristic image sequences is three. The first characteristic image sequence only includes the first characteristic image. The second characteristic image sequence only includes the first characteristic image and the second characteristic image. The third characteristic image sequence only includes the first characteristic image, the second characteristic image, and the third characteristic image. In other words, the third characteristic image sequence corresponds to the positioning image sequence. Since the number of the third characteristic image sequence is one, the processor 30 estimates the position of the vehicle 36 according to the displacement D2, the electronic map, the path corresponding to the positioning image sequence, and the characteristic positions of the second characteristics image and the third characteristic image.

In conclusion, the present invention compares images to position a vehicle without using a global positioning system, thereby reducing the storing space of an electronic map.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An image positioning method, which finds a position of a vehicle that is driving on a road, and a plurality of signs is sequentially arranged on the road in a direction that the vehicle moves, and the image positioning method comprising:
   (a) providing an electronic map having a plurality of paths, a plurality reference images, and characteristic positions of the plurality of paths and the plurality reference images, and the characteristic positions of the plurality of reference images correspond to the characteristic positions of the plurality of paths;
   (b) retrieving an n-th positioning image of the sign closest to the vehicle, searching the reference images identical to the n-th positioning image on the electronic map, and using the reference images identical to the n-th positioning image as n-th characteristic images, wherein n is a natural number;
   (c) after the step of retrieving the n-th positioning image and searching the n-th characteristic images, retrieving an (n+1)-th positioning image of the sign closest to the vehicle after the vehicle moves a displacement on the road, searching the reference images identical to the (n+1)-th positioning image on the electronic map according to the electronic map, the displacement, and the characteristic positions of the n-th characteristic images, and using the reference images identical to the (n+1)-th positioning image as (n+1)-th characteristic images; and
   (d) ordering all the characteristic images corresponding to each other according to their searched time to establish characteristic image sequences, and ordering all the positioning images according to their retrieved time to establish a positioning image sequence, and determining whether number of the characteristic image sequences that correspond to the positioning image sequence is one, wherein the characteristic image sequence includes the n-th characteristic image and the (n+1)-th characteristic image, the n-th characteristic image and the (n+1)-th characteristic image of the characteristic image sequence are sorted in order of time of searching the n-th characteristic image and the (n+1)-th characteristic image, the positioning image sequence includes the n-th positioning image and the (n+1)-th positioning image, and the n-th positioning image and the (n+1)-th positioning image of the positioning image sequence are sorted in order of time of retrieving the n-th positioning image and the (n+1)-th positioning image:
      if yes, estimating the position of the vehicle according to the displacement, the electronic map, the path corresponding to the positioning image sequence, and the characteristic positions of the n-th characteristic image and the (n+1)-th characteristic image; and
      if no, adding 1 to n and repeatedly performing operation (c).

2. The image positioning method according to claim 1, wherein the sign is a signboard, a guideboard, a landmark, a traffic sign, or a traffic light.

3. The image positioning method according to claim 1, wherein the reference image is an image of a signboard, a guideboard, a landmark, a traffic sign, or a traffic light.

4. The image positioning method according to claim 1, wherein the position of the vehicle and the characteristic position are absolute coordinates.

5. The image positioning method according to claim 1, wherein the displacement comprises a straight displacement and an angle displacement.

6. An image positioning device, which installed in a vehicle that is driving on a road, and a plurality of signs is sequentially arranged on the road in a direction that the vehicle moves, and the image positioning device comprising:
   an image retriever sequentially retrieving an n-th positioning image and an (n+1)-th positioning image of the signs closest to the vehicle, and n is a natural number, and the image retriever generates driving signals when the image retriever retrieves the n-th positioning image and the (n+1)-th positioning image;
   a storage storing an electronic map, and the electronic map has a plurality of paths, a plurality reference images, and characteristic positions of the plurality of paths and the plurality reference images, and the characteristic positions of the plurality of reference images correspond to the characteristic positions of the plurality of paths;
   a displacement detector electrically connected to the image retriever and receiving the driving signals, and the displacement detector detects a displacement that the vehicle moves within a period between two time points when the displacement detector receives the driving signals; and
   a processor electrically connected to the image retriever, the storage, and displacement detector, and the processor searches the reference images identical to the n-th positioning image on the electronic map, uses the reference images identical to the n-th positioning image as n-th characteristic images, searches the reference images identical to the (n+1)-th positioning image on the electronic map according to the electronic map, the displacement, and the characteristic positions of the n-th characteristic images, uses the reference images identical to the (n+1)-th positioning image as (n+1)-th characteristic images, orders all the characteristic images corresponding to each other according to their searched time to establish characteristic image sequences, and orders all the positioning images according to their retrieved time to establish a positioning image sequence, and when number of the characteristic image sequences that correspond to the positioning image sequence is one, the processor estimates a position of the vehicle according to the displacement, the electronic map, the path corresponding to the positioning image sequence, and the characteristic positions of the n-th characteristic image and the (n+1)-th characteristic image, wherein the characteristic image sequence includes the n-th characteristic image and the (n+1)-th characteristic image, the n-th characteristic image and the (n+1)-th characteristic image of the characteristic image sequence are sorted in order of time of searching the n-th characteristic image and the (n+1)-th characteristic image, the positioning image sequence includes the n-th positioning image and the (n+1)-th positioning image, and the n-th positioning image and the (n+1)-th positioning image of the positioning image sequence are sorted in order of time of retrieving the n-th positioning image and the (n+1)-th positioning image.

7. The image positioning device according to claim 6, wherein the processor endlessly increases n until the number of the characteristic image sequences that correspond to the positioning image sequence is one.

8. The image positioning device according to claim 6, wherein the displacement detector further comprises:
   an accelerator measuring accelerations within the period; and
   a displacement calculator electrically connected to the accelerator, the image retriever, and the processor, receiving the accelerations and the driving signals, and calculating the displacement according to the accelerations, the period, and the driving signals.

9. The image positioning device according to claim 6, wherein the image retriever is a camera.

10. The image positioning device according to claim 6, wherein the sign is a signboard, a guideboard, a landmark, a traffic sign, or a traffic light.

11. The image positioning device according to claim 6, wherein the reference image is an image of a signboard, a guideboard, a landmark, a traffic sign, or a traffic light.

12. The image positioning device according to claim 6, wherein the position of the vehicle and the characteristic position are absolute coordinates.

13. The image positioning device according to claim 6, wherein the displacement comprises a straight displacement and an angle displacement.

* * * * *